W. B. LLOYD.
WHEEL.
APPLICATION FILED MAY 22, 1911.
999,379.
Patented Aug. 1, 1911.
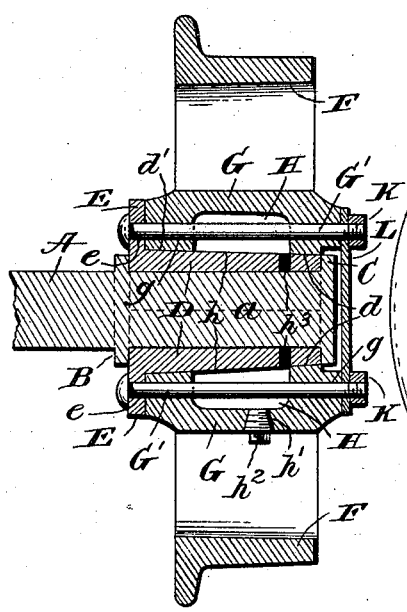
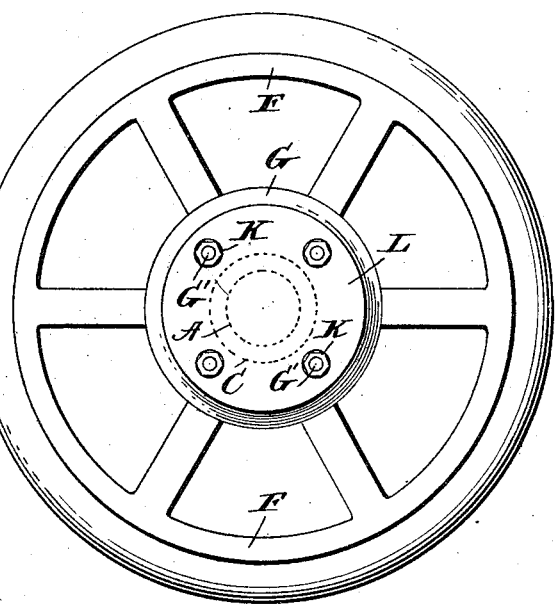
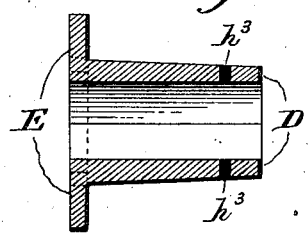
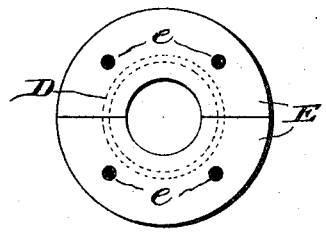
Witnesses:
Jas E Hutchinson
Carrie A Krey
Inventor:
William B. Lloyd,
By Mason Means Attorneys
COLUMBIA PLANOGRAPH CO., WASHINGTON, D. C.

UNITED STATES PATENT OFFICE.

WILLIAM B. LLOYD, OF YANKEE, TERRITORY OF NEW MEXICO.

WHEEL.

999,379.  Specification of Letters Patent.  Patented Aug. 1, 1911.

Application filed May 22, 1911. Serial No. 628,846.

*To all whom it may concern:*

Be it known that I, WILLIAM BERNARD LLOYD, a citizen of the United States, residing at Yankee, in the county of Colfax and Territory of New Mexico, have invented certain new and useful Improvements in Wheels, of which the following is a specification, reference being had therein to the accompanying drawing.

This invention relates to improvements in wheels, especially adapted for use in connection with mine cars, although the improvements are capable of use in other connections, as will be apparent.

The invention has for its object the improvement of means enabling the renewal of the hubs of mine car wheels, so that worn out hubs may be removed and new ones inserted in lieu thereof, in connection with the relatively unimpaired tire rim or tread of the wheels.

The invention also has for its object the provision of a construction affording a practically oil-tight reservoir for lubricant.

A further object is to produce a construction minimizing the wearing friction between the axle and wheels, accomplished by providing a bearing for the wheel of a metal relatively soft compared to the axle.

The invention also embraces as one of its chief characteristics the provision of means for insuring retention of a wheel upon its axle until purposely removed.

With the foregoing objects in mind, I have illustrated in the accompanying drawings forming part hereof a convenient embodiment of the invention possessing certain details in arrangement and construction of parts, as will more fully hereinafter appear in connection with the following detailed description, but it will be obvious to those skilled in the art that the invention is capable of embodiment in other forms and devices than that specifically disclosed herein.

In the drawings, Figure 1 is a vertical sectional view through the wheel, the axle being shown in elevation, Fig. 2 is an end view of the wheel, Fig. 3 is a side elevation of the brass bearings detached, and Fig. 4 is an end view of Fig. 3.

Referring more specifically to the drawings, wherein like reference letters refer to the same parts in the several views, A represents a car axle having separated annular collars or flanges B, C, formed integral therewith, the latter at the end of the axle, and the former a suitable distance inwardly from the end of the same.

D represents a two-part bearing, preferably of brass, the body portion of which is cylindrical and of a diameter and length to fit snugly around the bearing portion $a$ of the axle and between the confining collars or flanges B and C. The outer surface of the cylindrical portion of the bearing is tapered in an outward direction, as at $d$, and the end of this two-part bearing is provided with a corresponding two-part flange E projecting outwardly a substantial distance beyond the collar or flange B, and provided with bolt openings $e$.

F is the rim portion of the wheel, the same being provided with a flanged tread for use in connection with suitable rails, as is common in the case of mine car wheels, it being unnecessary to show said rails herein, and G is the hub portion usually cast integrally with the rim, the same in this instance being formed hollow as at H to constitute a chamber for lubricant, opening at $h$ to the brasses D and having a fill opening $h'$ normally closed by a detachable plug $h^2$.

The bore of the hub portion H is tapered inwardly as at $d'$, so as to have a wedged or binding engagement with the brass bearing D and serving also to create a sealing engagement between the same preventing escape of oil therebetween, it being understood that the oil is supplied to the axle through relatively small openings $h^3$ passing laterally through the brasses to the bearing portion $a$ of the axle.

To securely fasten the wheel against removal from the axle, I provide a series of clamping bolts G',—four being shown,—the same passing transversely through apertures $g$ in the hub portion G of the wheel and through the flange E of the brass bearing. The bolts are preferably introduced from the inner side of the wheel, so that the heads thereof will bear against the flange E, the outer ends of the bolts projecting through the outer side of the wheel being engaged by suitable nuts K.

L is a plate of suitable size and shape to cover the outer end of the hub portion G, the same being appropriately styled a combined washer and seal, it being observed that the securing nuts K bear against this plate, and the plate in turn being firmly clamped flat against the end surface of the hub portion effectually closes the open end of the latter, and overcomes any possibility of lubricant escaping therewithout. By locking the hub of the wheel at the series of points so effectually to the flange E, and the main portions of the brass bearing to which said flange is secured being so firmly seated between the flanges of collars B and C, it is seen that it is rendered practically impossible that the wheels become accidentally loosened or freed from the axle. I regard this as an important feature of my improvements.

I claim:

1. In combination with an axle having separated flange portions, the outer flange being fixed to said axle, a bearing member seated between said flange portions and having a flange at one end thereof, a wheel having a hub portion fitting over said bearing, and fastening means securing said hub portion and said flange of the bearing member together.

2. In combination with an axle having separated flange portions, the outer flange being fixed to said axle, a bearing member seated between said flange portions and having a flange at one end thereof, a wheel having a hub portion fitting over said bearing, the outer surface of the bearing and the inner surface of the hub portion being similarly tapered, and fastening means for securing said hub portion and the flange of the bearing member together.

3. The combination with an axle having separated flange portions, the outer flange being fixed to said axle, a bearing member seated between said flange portions and having a flange at one end thereof, a wheel having a hub portion fitting over said bearing, and fastening means securing said hub portion and said flange of the bearing member together, the hub portion being hollow to constitute an oil chamber, and the bearing being provided with oil passages leading from said chamber to the axle.

4. In combination with an axle having separated flange portions, the outer flange being fixed to said axle, a bearing member seated between said flange portions and having a flange at one end thereof, a wheel having a hub portion fitting over said bearing, the outer surface of the bearing and the inner surface of the hub being similarly tapered, and fastening means for securing said hub portion and the flange of the bearing member together, the hub portion being hollow to constitute an oil chamber, and the bearing being provided with an oil passage leading from said chamber to the axle.

5. In combination with an axle having separated flange portions, a bearing member seated between said flange portions and having a flange at its inner end, a wheel having a hub portion fitting over said bearing and separated fastening devices passing through said hub portion and engaging said flange, and a plate covering the outer end of the hub portion and clamped against same, substantially as described.

6. In combination with an axle having separated flange portions, a bearing member seated between said flange portions and having a flange at its inner end, a wheel having a hub portion fitting over said bearing, and separated fastening devices passing through said hub portion and engaging said flange, the outer surface of the bearing and the inner surface of the hub portion being correspondingly tapered to create a binding engagement therebetween, and a plate covering the outer end of the hub portion and clamped against same, substantially as described.

7. In combination with an axle having separated flange portions, a bearing member seated between said flange portions and having a flange at its inner end, a wheel having a hub portion fitting over said bearing, and separated fastening devices passing through said hub portion and engaging said flange, the hub portion being hollow to constitute an oil chamber and the bearing being provided with oil passages leading from said chamber to the axle, and a plate covering the outer end of the hub portion and clamped against same, substantially as described.

8. In combination with an axle having separated flange portions, a bearing member seated between said flange portions and having a flange at its inner end, a wheel having a hub portion fitting over said bearing, and separated fastening devices passing through said hub portion and engaging said flange, the outer surface of the bearing and the inner surface of the hub portion being correspondingly tapered to create a binding engagement therebetween, the hub portion being hollow to constitute an oil chamber and the bearing being provided with oil passages leading from said chamber to the axle, and a plate covering the outer end of the hub portion and clamped against same, substantially as described.

9. In combination with an axle having separated flange portions, a bearing member seated between said flange portions and having a flange at its inner end, a wheel having a hub portion fitting over said bearing, and fastening means securing the same to the flange of the said bearing, and a plate covering the outer end of the hub portion and clamped against the same, substantially as described.

In testimony whereof I affix my signature in presence of two witnesses.

WILLIAM B. LLOYD.

Witnesses:
    CHAS. PRATOR,
    CHAS. R. IRVIN.

Copies of this patent may be obtained for five cents each, by addressing the "Commissioner of Patents, Washington, D. C."